T. F. CAIN & W. A. SKINNER.
DUMP ASH PAN FOR LOCOMOTIVES.
APPLICATION FILED MAY 13, 1912.
1,106,544.
Patented Aug. 11, 1914.
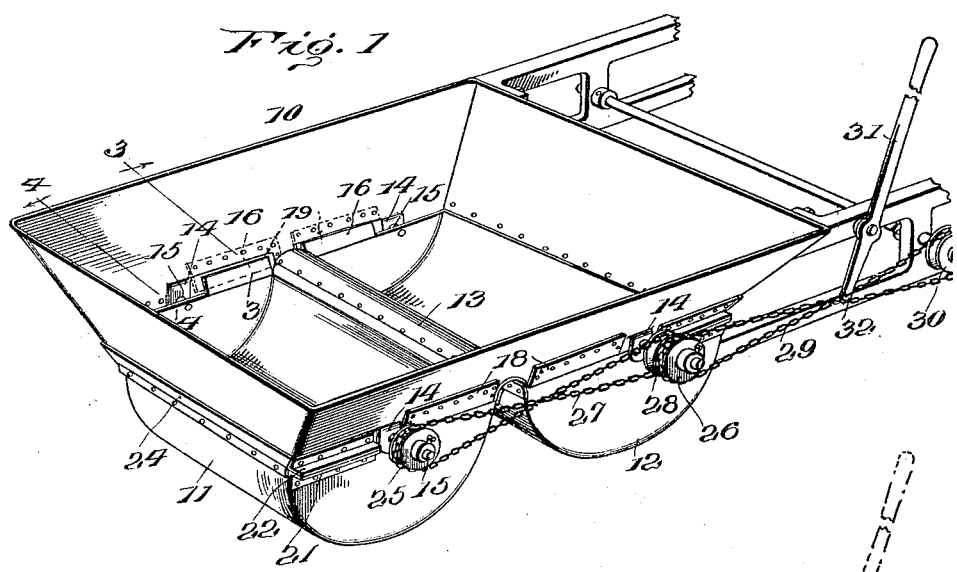
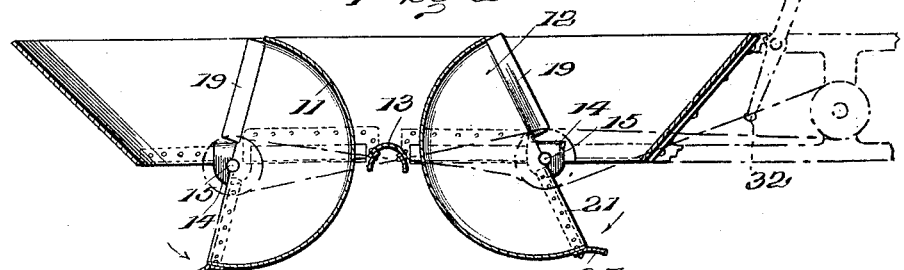
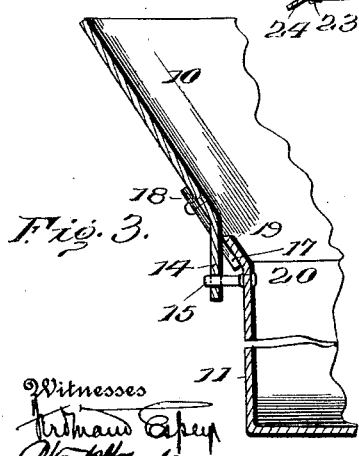
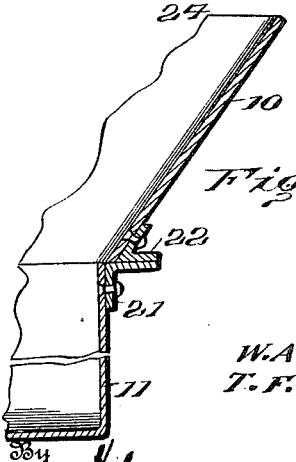
Inventors
W. A. Skinner and
T. F. Cain.

UNITED STATES PATENT OFFICE.

THOMAS F. CAIN, OF MONTGOMERY CITY, AND WALTER A. SKINNER, OF MOBERLY, MISSOURI.

DUMP ASH-PAN FOR LOCOMOTIVES.

1,106,544. Specification of Letters Patent. Patented Aug. 11, 1914.

Application filed May 13, 1912. Serial No. 697,024.

*To all whom it may concern:*

Be it known that we, THOMAS F. CAIN, and WALTER A. SKINNER, citizens of the United States, residing at Montgomery City and Moberly, respectively, in the counties of Montgomery and Randolph, respectively, and State of Missouri, have invented certain new and useful Improvements in Dump Ash-Pans for Locomotives, of which the following is a specification.

Our invention relates to new and useful improvements in dumping pans for locomotives and the object of our invention is to provide a pan adapted to be positioned immediately below the fire box of the locomotive in position to receive the ashes and coals shaken or dumped therefrom.

A further object of our invention is to provide the pan with a false bottom including a plurality of swingingly mounted pans which, in normal position, close the bottom of the pan proper and which may be operated from the cab to dump their contents.

A further object of our invention is to so construct the pan as to prevent the continued burning of coals dumped therein and therefore to prevent the clogging of the pan by the forming of clinkers.

A further object of our invention is to so position and mount the swinging pans as to render them readily accessible for cleaning purposes in case they do become clogged. And a still further object of our invention is to provide a simple and effective means for swinging the movable pans to dump their contents.

With these and other objects in view, our invention will be more fully described, illustrated in the accompanying drawings, and then specifically pointed out in the claims which are attached to and form a part of this application.

In the drawings: Figure 1 is a perspective view of our improved dumping pan; Fig. 2 is a central longitudinal section of the same, the pans being shown in partially turned position; Fig. 3 is a fragmentary section on the line 3—3 of Fig. 1; Fig. 4 is a like view on the line 4—4 of Fig. 1.

Corresponding and like parts are referred to in the following description and indicated in all the views of the drawings by the same reference characters.

The preferred embodiment of our invention includes a body member or pan proper, 10 open at its upper and lower ends and positioned immediately below the fire box of the locomotive with its upper end spaced a slight distance below the fire box in order to permit the free passage of air to the fire, and a pair of swingingly mounted dump pans 11 and 12 so positioned and mounted as to normally form a closure for the lower end of the pan proper, 10. The body member or pan proper, 10 is substantially rectangular in shape with its side and end walls converging inwardly, as shown. The side walls are connected centrally at their lower edges by a transversely extending brace 13 which, when the pan is in position, seats over the rear driving axle of the locomotive and assists in supporting the pan. This brace, as shown, is arcuate in section to conform to the axle and not only serves to brace the body member of the pan, but also as a partition wall between the adjacent ends of the dump pans 11 and 12. Each of these dump pans includes a semi-cylindrical body member provided at its upper ends with outwardly directed trunnions 15 which are journaled in suitable ears 14 formed on the lower side portions of the body member 10. As shown, these ears and trunnions are formed at a slight distance from the centers of the ends of the pan, whereby the pans will normally be held by gravity in operative position to close the lower end of the body member, the inner or abutting sides of the pans being held against downward swinging in a manner to be presently described.

The lower edge portions of the sides of the body member are cut-away as at 16 to provide space for the inwardly directed flanges 17 of strips of iron 18 which are secured by their edges to the outer faces of the side members, these iron strips being so formed that their flanges 17 extend inwardly to form seats for the reception of the flanges 19 or extended portions of the upper side edges of the dump pans 11 and 12. The opposite ends of the side of the dump pans are provided with strips of angle iron 21 which engage with strips of angle iron 22 carried by the end portions of the sides of the body member, while the outer sides of the dump pans are reinforced by strips 23 which have upwardly and outwardly directed lips 24 which engage against the outer faces of the ends of the body member. The inner sides of the dump pans bear by their outer faces against the arcuate upper face of the brace 13 when the pans are in normal position.

By pivoting the pans as described, they are normally held in operative position by gravity and when so held form a practically air tight closure for the body member or pan proper. It will therefore be seen that any live coals which drop into the pan will go out for lack of the necessary air to support combustion and all formation of clinkers within the pan is therefore avoided. Moreover, by mounting the dump pans in the manner described, when their inner ends are swung upwardly to dump their contents, the pans are spaced as far above the road bed as when in normal position and all danger of ripping the pans from place, while dumping them during movement of the locomotive, is avoided. When the pans are being emptied they are readily accessible with a bar to clean out such clinkers as may have formed as their widest opening is under the dump grates either in front of or at the back of the fire box.

As a means for simultaneously tilting the movable pans to dump their contents, we have extended the trunnions upon one side of the pan to receive pulleys 25 and 26 which are grooved to receive a crossed chain 27, the grooves in the pulleys being such as to grip the chain and prevent its slipping. It will therefore be seen that rotation of either pulley will cause an equal and opposite rotation of the other. The pulley 26 is provided with a second groove 28 and a crossed chain 29 engages in this groove and in the groove of an idle pulley 30 mounted for rotation upon the frame of the cab. The shaker bar 31 is provided with a hooked terminal 32 which may be engaged in one of the links of the chain 29, whereby the chain may be actuated to rotate the pulley 26 and consequently the pulley 25.

In operation, the ashes and coals are shaken or dumped into the dump pan where they may remain until a convenient place for dumping the same is reached. The shaker bar is then engaged with the chain 29 and actuated to swing the inner ends of the pans upwardly to dump their contents.

It will of course be understood that both the body member of the pan proper and the movable pans will be formed of any suitable metal and of sufficient weight to withstand the strains and heat to which they will be subjected.

Having thus described the invention, what is claimed as new is:

1. A dump ash pan including a body member open at its top and bottom, a centrally disposed transversely extending brace connecting the side walls of the body, a pair of pans swingingly mounted between the ends of the body and the brace to normally form a bottom closure for the body, lips formed on the outer longitudinal edges of the pans for engagement with the outer face of the end walls of the body member whereby the swinging movement of the pans is limited, flanges carried by the opposite terminal portions of the end portions of the pans, said flanges being adapted to engage the lower faces of similar flanges carried by the opposite end portions of the side walls of the body member, flanges carried by the adjacent portions of the end walls of the pans and arranged to engage angularly and inwardly directed flanges carried by the side walls of the body member on opposite sides of the said brace, all of the said flanges being adapted to coact when the pans are in closed position to substantially seal the open bottom of the body member.

2. A dump ash pan including a body member having an open top and bottom and inclined end walls, the end portions of the side walls being provided with outwardly directed flanges and the remaining portions of the side walls being provided with inwardly directed flanges, and a pair of parallelly disposed pans swingingly mounted to normally form a bottom for the body, the outer sides of each pan being provided with outwardly directed lips for engagement against the inclined end walls of the body member, the end portions of the pans being provided with outwardly directed flanges for engagement against the upper face of the inwardly directed flanges of the body member and with flanges engageable with outwardly extending flanges carried by the body side walls.

In testimony whereof we affix our signatures in presence of two witnesses.

THOMAS F. CAIN. [L. S.]
WALTER A. SKINNER. [L. S.]

Witnesses:
 BEN APPLING,
 J. E. OWINGS.

Copies of this patent may be obtained for five cents each, by addressing the "Commissioner of Patents, Washington, D. C."